United States Patent Office 2,881,060
Patented Apr. 7, 1959

2,881,060

HYDROCARBON GELS

Carl B. Linn, Riverside, Ill., assignor to Universal Oil Products Company, Des Plaines, Ill., a corporation of Delaware No Drawing. Application March 16, 1955
Serial No. 494,801

9 Claims. (Cl. 44—7)

This application is a continuation-in-part of my copending application Serial No. 449,523, filed August 12, 1954 (now Patent No. 2,798,100), which is a continuation-in-part of my application Serial No. 360,838, filed June 10, 1953 (now Patent No. 2,798,098), which is a continuation-in-part of my application Serial No. 212,839, filed February 26, 1951, and now abandoned.

This application relates generally to new compositions of matter comprising gelled hydrocarbons, and more specifically, to new compositions comprising hydrocarbons and a diaryl-desoxy-ketitol. Still more specifically, this invention relates to a new composition of matter comprising a hydrocarbon and a product formed by condensing a ketose with two molecular proportions of an aromatic hydrocarbon in the presence of a condensation catalyst at condensation conditions. The new compositions of matter of the present invention are useful for military purposes, particularly where semisolid or gelled fuels are desirable. Semisolid or gelled fuels are utilized by the military forces in bombs of the bursting and tail-ejection type, and as incendiary fuels for use in flame throwers, hand grenades, etc.

Prior to World War II, semisolid or gelled fuels were produced by adding rubber, particularly natural rubber, to gasoline and similar hydrocarbon liquids. The shortage of rubber during World War II to a widespread search for substitute gelling agents for hydrocarbons. Substitute gelling agents utilized widely during World War II (and since then) include soaps of polyvalent metals, particularly aluminum. These aluminum soaps which have been used for this purpose are two main types. One type comprises a group of aluminum salts of saturated fatty acids such as the aluminum laurates, palmitates, stearates, and myristrates. The second type of aluminum soaps utilized were the aluminum oleates. Certain mixtures of these two types of aluminum soaps were and are in widespread use for the production of munitions. The most satisfactory compositions are described in U.S. Patent 2,606,107.

However, these gelled hydrocarbon compositions still suffer from an inherent deficiency, namely, they contain metals, particularly aluminum. As is well known, the presence of even minute traces of certain metals in hydrocarbons catalyze deleterious reactions such as oxidative deterioration, polymerization, etc. Therefore, gelled hydrocarbon compositions utilized prior to the present invention could not and cannot be kept stored for any lengthy period of time. For military purposes it is common and has been found necessary to prepare these gelled hydrocarbons as near in time as to actual use as is possible. These and other deficiencies can be readily overcome by the utilization of the compositions of the present invention. Since the compositions of the present invention are totally organic, the difficulties enumerated hereinabove are not encountered.

In one embodiment, the present invention relates to a composition of matter comprising a hydrocarbon and a diaryl-desoxy-ketitol.

In another embodiment the present invention relates to a composition of matter comprising an aromatic hydrocarbon and a diaryl-desoxy-ketitol.

Still another embodiment of this invention relates to a new composition of matter comprising a hydrocarbon and a ditolyl-desoxy-ketitol.

A further embodiment of this invention relates to a composition of matter comprising an aromatic hydrocarbon and a ditolyl-desoxy-ketitol.

As set forth hereinabove, the novel compositions of matter of the present invention comprise gelled mixtures of hydrocarbons and the product formed by condensing a ketose with two molecular proportions of an aromatic hydrocarbon in the presence of a condensation catalyst at condensation conditions. The hydrocarbon with which the diaryl-desoxy-ketitol is composited may be selected from innumerable pure hydrocarbons and mixtures thereof. The hydrocarbon or hydrocarbons may be saturated, unsaturated, or aromatic. The aromatic hydrocarbons are particularly preferred. Hydrocarbons utilizable in forming the new composition of matter of the present invention include normal butane, isobutane, pentanes, hexanes, heptanes, octanes, nonanes, decanes, undecanes, etc., including their many isomeric structures; butenes, including 1-butene, 2-butene, and isobutylene, pentenes, hexenes, heptenes, octenes, nonenes, decenes, undecenes, dodecenes, etc., including their many isomeric structures; cyclopentane, methylcyclopentane, dimethylcyclopentane; cyclohexane, methylcyclohexane, ethylcyclohexane, dimethylcyclohexane, etc; cyclopentene, methylcyclopentene, ethylcyclopentene, dimethylcyclopentene, diethylcyclopentene, cyclohexene, methylcyclohexene, ethylcyclohexene, dimethylcyclohexene, etc.; and benzene, toluene, o-xylene, m-xylene, p-xylene, ethylbenzene, cumene, cymenes, etc. Hydrocarbon fractions such as those derived from petroleum or vegetable sources, are also within the scope of this invention and include such fractions as gasoline (leaded or unleaded), naphtha, petroleum ether, Stoddard's solvent, diesel oil, light cycle oil, fuel oil, turpentine, dipentene, etc. A particularly preferred hydrocarbon fraction is catalytically reformed gasoline containing more than 10% aromatic hydrocarbons. Examples of other hydrocarbons utilizable within the broad scope of this invention are readily apparent to one skilled in the art.

The novel composition of the present invention comprises a hydrocarbon, as described hereinabove, and a diaryl-desoxy-ketitol. These diaryl-desoxy-ketitols are formed by reacting a ketose sugar or a ketose carbohydrate with two molecular proportions of an aromatic compound to yield products in which each of the aryl groups is bound chemically to the original carbonyl carbon atom of the ketose. The condensation of an aromatic hydrocarbon with a ketose sugar or ketose carbohydrate may be carried out in the presence of various condensation catalysts at condensation conditions. For example, this condensation reaction may be carried out in the presence of hydrogen fluoride at a temperature of about —20° to about 100° C. and preferably at a temperature of from about —10° to about 50° C. Other suitable catalysts include metal halides of the Friedel-Crafts type, particularly aluminum chloride, as such or modified by the addition thereto of an alcohol, ether, ester, nitroparaffin, alkyl halide, and the like. Mixtures of boron trifluoride and hydrogen fluoride may also be employed. These condensation reactions may be carried out in glass or steel equipment depending upon the particular condensation catalyst utilized, or in other suitable apparatus constructed from silver, copper, and certain alloys such as Monel metal and the like. The pressure at which the reaction is carried out will vary from atmospheric pressure to pressures of 50 or 100 atmospheres or more and will be dependent upon the particular condensation catalyst utilized, the reaction temperature employed, the mol fractions of reactants utilized, and the volume of the particular reactor in which the condensation reaction is conducted. In many instances, it is convenient to operate at the pressure generated by the mixture of reactants and catalyst employed.

Aromatic hydrocarbons suitable for use in the production of the diaryl-desoxy-ketitols utilized in the composition of the present invention include benzene, toluene, o-xylene, m-xylene, p-xylene, ethylbenzene, 1,2,3-trimethylbenzene, 1,2,4-trimethylbenzene, 1,3,5-trimethylbenzene or mesitylene, o-ethyl toluene, p-ethyl toluene, n-propylbenzene, isopropylbenzene or cumene, butylbenzene, amylbenzene, and higher molecular weight alkylaromatic hydrocarbons such as formed by the alkylation of low molecular weight aromatic hydrocarbons with alkylating agents such as olefin polymers, i.e., nonenes, dodecenes, etc. formed from the polymerization of propylene. These higher molecular weight alkylaromatic hydrocarbons include such materials as hexylbenzenes, hexyltoluenes, dodecylbenzenes, dodecyltoluenes, etc. Often, alkylate is obtained as a high boiling fraction in which case the alkyl group attached to the aromatic hydrocarbon may contain from about 6 to about 24 carbon atoms.

Other aromatic hydrocarbons suitable for conversion into diaryl-desoxy-ketitols include those with two or more aryl groups, such as diphenyl, diphenylmethane, triphenylmethane, etc. Also, examples of suitable aromatic hydrocarbons which contain condensed benzene rings include naphthalene, anthracene, phenanthrene, and also alkylated naphthalenes, alkylated anthracenes, and the like.

The ketoses which are condensed with aromatic hydrocarbons to form the diaryl-desoxy-ketitols utilized in the novel compositions of matter of this invention, are monosaccharides, and according to their chemical nature may be considered to be hydroxy ketones. According to the number of oxygen atoms present in the molecule of the ketones, they are called trioses, tetroses, pentoses, hexoses, and the like. These ketoses have the general formula $C_nH_{2n}O_n$ in which $n$ generally equals 3 to about 8. With the exception of the simplest ketose, dihydroxyacetone, all of these monosaccharides have one or more asymmetric carbon atoms and must therefore occur in stereoisomeric forms.

The diarylated ketoses or diaryl-desoxy-ketitols may also be prepared from aromatic hydrocarbons and polysaccharides which yield ketose units on hydrolysis. Such polysaccharides includes sucrose, inulin, turanose, raffinose, gentianose, melezitose, stachyose, and verbascose.

The simplest ketoses which may be condensed with aromatic hydrocarbons to form the diaryl-desoxy-ketitols utilized in the novel composition of this invention may be represented by the formula:

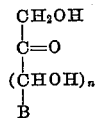

in which $n$ is an integer from about 1 to about 8 and B represents hydrogen and $CH_2OH$. As an example of the utility of this general formula, when $n$ equals 1 and B equals hydrogen, the compound is then symmetrical dihydroxyacetone; when $n$ equals 1 and B equals $CH_2OH$, the compound is erythrose; when $n$ equals 2 and B equals $CH_2OH$, the compound is riboketose or xyloketose; when $n$ equals 3 and B equals $CH_2OH$, the compound is psicose, fructose, sorbose, or tagatose; and when $n$ equals 4 and B equals $CH_2OH$, the compounds are heptoses.

As set forth hereinabove, the novel compositions of matter of the present invention comprise a hydrocarbon and a diaryl-desoxy-ketitol prepared by condensing a ketose with two molecular proportions of an aromatic hydrocarbon at condensation conditions in the presence of a condensing agent. Suitable condensing agents set forth include aluminum chloride, as such or modified, other Friedel-Crafts metal halides, mixtures of hydrogen fluoride and boron trifluoride, and hydrogen fluoride itself. When hydrogen fluoride itself is utilized as the condensing agent, it may be used in anhydrous form or diluted with water to make a hydrofluoric acid of the desired concentration. The hydrofluoric acid may also be modified or diluted further with various inert diluents when it is desired to operate the process with low hydrogen fluoride concentrations. Suitable inert diluents include perfluoro derivatives of normal paraffinic hydrocarbons such as perfluoropropane, perfluoro-n-butane, perfluoro-n-pentane, etc. In some instances, hydrofluoric acid of from about 85 to about 100% HF concentration is desirable, and in some other instances, it is more desirable to use substantially anhydrous hydrogen fluoride as the catalyst.

When hydrogen fluoride is utilized as the condensation agent, the condensation reaction may be carried out by adding hydrogen fluoride slowly to a stirred mixture of the aromatic hydrocarbon and ketose, or, reversely, the mixture of aromatic hydrocarbon and ketose may be added with stirring to hydrogen fluoride while maintaining the condensation temperature at from about —20° to about 100° C. By using suitable cooling and/or heating means, it is often advisable or desirable to commingle the reactants and condensing agent at a relatively low temperature such as from about —80° to about —30° C. and then to permit the reaction mixture to warm gradually while the reactants and catalyst are stirred by suitable means such as a motor driven stirrer or other mixing equipment. After the reaction has reached the desired degree of completion, the hydrogen fluoride condensing agent may be removed from the reaction mixture by distillation at atmospheric pressure or lower or by passing an inert gas through the reaction mixture while maintaining it at relatively low temperature. Also, the entire reaction mixture and catalyst may be mixed with water or may be added to ice in order to quench the activity of the condensing agent and to permit separation of the organic reaction products and unreacted starting materials from the catalyst. The organic reaction products may also be separated from the condensing agent by means of an organic solvent such as ether in which some of the organic material may be dissolved. Further methods of isolating the reaction products are illustrated in the examples.

The novel compositions of matter of this invention may be prepared simply by admixing the desired hydrocarbon or hydrocarbon mixture or hydrocarbon fraction with the desired diaryl-desoxy-ketitol. In general, to form stable gels, the amount of diaryl-desoxy-ketitols admixed with the desired hydrocarbon will range from about 0.1 to about 25% by weight. Of course, the maximum amount by weight of the diaryl-desoxy-ketitol which is admixed with the hydrocarbon will depend upon the specific solubility of the particular diaryl-desoxy-ketitol therein. Thus, where the diaryl-desoxy-ketitol is produced from an aromatic hydrocarbon containing long chain alkyl groups, the diaryl-desoxy-ketitol will be more compatible with the hydrocarbon than when lower molecular weight aromatic hydrocarbons are used in forming or producing the diaryl-desoxy-ketitol. Since the diaryl-desoxy-ketitol is the more expensive of the two components of the novel composition of this invention, a minimum quantity to form the desired gel will be in most cases the maximum quantity utilized. This minimum amount of course can vary as it may be desirable to vary the stiffness of the gel from time to time. In most cases, the preferred amount of diaryl-desoxy-ketitol will vary from about 1 to about 15% by weight based on the hydrocarbon utilized in forming this new composition of matter.

As set forth hereinabove, the novel composition of matter of this invention is prepared by admixing a hydrocarbon or mixture of hydrocarbons or a hydrocarbon fraction with a diaryl-desoxy-ketitol. This mixing can be carried out in any desired manner, as for example, in the batch type operation. The mixing can be carried out at room temperature or higher as is desirable. Since the solubility of the diaryl-desoxy-ketitols in hydrocarbons is limited it is often desirable, and in some cases, necessary, to heat the mixture to form a clear solution which on cooling sets to a clear stiff gel. This heating can be carried out up to temperatures of 200° C. or higher, the limiting temperature of course being the boiling point of the particular hydrocarbon utilized in forming this novel composition of matter. The gels formed will range in type from semisolids or stiff gels down to varying plastic semi-liquid types.

The process of this invention is illustrated further by the following examples which are incorporated herein for the purpose of illustration and with no intention of unduly limiting the generally broad scope of this invention.

EXAMPLE I

This example illustrates the preparation of gels from hydrocarbons and the condensation product of fructose with two molecular proportions of toluene. The reaction of fructose with toluene was carried out in the presence of liquid hydrogen fluoride at temperatures ranging from 0° to 30° C. utilizing contact times of from about 3 to about 66 hours.

An outline of the procedure used in reacting d-fructose with toluene in the presence of hydrogen fluoride is as follows: d-fructose and toluene were sealed in a turbo-mixer one liter autoclave. After cooling to about —40° C., hydrogen fluoride was added to the turbomixer autoclave under pressure from a weighed autoclave and the contents of the autoclave were then stirred for the required time at ice temperature, and in one case, at 30° C. At the end of the reaction time, a stream of nitrogen was passed through the reactor for one to three hours, thus removing most of the hydrogen fluoride. The autoclave was opened and the contents transferred to a silver dish which was later placed in a hood-draft for 18 to 24 hours, after which the hydrogen fluoride remaining in the product was minor. The product then was washed thoroughly with pentane to remove pentane-soluble components after which it was separated into a cold water-soluble fraction and cold water-insoluble fraction. Each of these three fractions was then worked up separately to obtain the pure compounds therefrom. The desired product is found in the pentane-insoluble water-insoluble fraction as a n-propyl alcohol-soluble portion thereof. The reactions carried out and recovery of desired condensation product are summarized in the following table:

*Table I.—Reaction of d-fructose with toluene in the presence of hydrogen fluoride*

| Charge:[b] | Grams |
|---|---|
| d-Fructose | 50 |
| Toluene | 170 |
| HF | 220 |

| Run No | 21 | 22 | 23 | 24 | 25 | 26 | 27 |
|---|---|---|---|---|---|---|---|
| Conditions of reaction: | | | | | | | |
| Temp., ° C | 0 | 0 | 0 | 0 | 0 | 0 | 30 |
| Contact time, hrs | 3 | 5 | 16.7 | 20 | 45 | 66 | 3 |
| Recovery, grams: | | | | | | | |
| Pentane-soluble | | 2 | 2 | 1 | | 10 | 24 |
| Water-soluble | 42 | 50 | 39 | 35 | 15 | 10 | 1.3 |
| Water-insoluble [a] | 7 | 15 | 35 | 48 | 84 | 139 | 84 |
| Net total | 49 | 67 | 76 | 84 | 99 | 159 | 109.3 |
| Toluene reacted, gms | 0 | 17 | 26 | 34 | 49 | 91 | 59 |
| Percent of water-insoluble material, also acetone-soluble | 44 | 56 | 83 | 97 | 100 | 100 | 50 |
| Acetone-soluble, gms | 18 | 28 | 32 | 34 | 15 | 10 | 0.6 |
| Yield of $C_{13}H_{18}O_5$, gms | 9 | 14 | 20 | 19 | 2 | | 0 |
| Yield of $C_{20}H_{24}O_3$, gms | | 5 | 11 | 16 | 28 | 46 | |

[a] Exclusive of pentane-soluble.
[b] In run 26, the charge was: d-fructose, 75 grams; toluene, 215 gms.; HF, 336 grams.

In the work with fructose at 0° C., it was observed that the reaction was slow. Three hours of contacting at 0° C. resulted in a small amount of total reaction product but as the contact time was increased, the amount of toluene reacting also increased. The data given in the table show that the water-soluble portion increased rapidly with time and then fell off, while there was a steady increase in the water-insoluble fraction with time.

An examination of the water-insoluble portion of the reaction products showed that it contained a compound which could be isolated by extraction and crystallization with normal propyl alcohol, by which method it was recovered in quantities amounting to about 30% of the water-insoluble fraction.

This substance hereinafter referred to as ditolyl-desoxy-fructose melts at 210° C. and has been assigned the following structural formula:

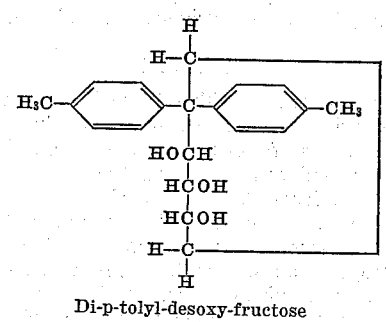

Di-p-tolyl-desoxy-fructose

It should be noted that the above compound contains a cyclohexane ring structure with the two aryl groups attached to the same carbon atom. This structure has been assigned to this compound on the basis of the following evidence:

(1) Elementary analysis:

| | Percent C | Percent H |
|---|---|---|
| Found, di-p-tolyl-desoxy-fructose | 76.53 | 7.68 |
| Calculated for $C_{20}H_{24}O_3$[c] | 76.89 | 7.74 |

[c] Shows a molecule containing two tolyl ($C_7$) residues, one fructose residue ($C_6$), and three oxygen atoms.

(2) Oxidation of the di-p-tolyl-desoxy-fructose yielded 4,4'-dicarboxybenzophenone. Therefore, the structural unit illustrated below is present:

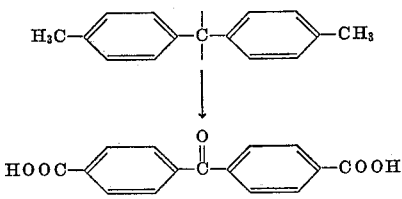

(3) The compound forms a triacetate when refluxed with acetic anhydride and pyridine. A crystalline acetate derivative, melting point 157° C., is isolated.

Elementary analysis:

|  | Percent C | Percent H |
|---|---|---|
| Found for acetate | 71.28 | 6.88 |
| Calculated for $C_{26}H_{30}O_6$ | 71.21 | 6.90 |

This shows that the three oxygen atoms demanded by the structural formula above are hydroxyl oxygen atoms.

(4) The compound contains no olefinic double bond. The compound is stable to alkaline permanganate solution and does not decolorize chloroform colored with bromine.

These data are all in accordance with the above-cited structure and exclude other possible structures except where the saturated carbon ring may be other than a $C_6$ ring, i.e., a $C_5$ ring.

All evidence considered, the above constitution is assigned to the diarylated fructose obtained. This is a 4,4-bis-(4-methylphenyl)-x,x',x'', cycloalkane triol and on the basis of present evidence is considered to be 4,4-bis-(4-methylphenyl)-1,2,3-cyclohexane triol.

This compound, namely, 4,4-bis-(4-methylphenyl)-1,2,3-cyclohexane triol forms stiff gels with benzene and other hydrocarbons. Five percent by weight of this compound was added to reagent grade benzene. The benzene was heated to its boiling point during which time the 4,4-bis-(4-methylphenyl)-1,2,3-cyclohexane triol dissolved. On cooling the benzene solution set to a stiff gel ideal for use in the production of military incendiaries. In similar experiments, the same compound was observed to gel pentane, cyclohexane, and other hydrocarbons.

EXAMPLE II 1-sorbose was reacted with toluene in the presence of hydrogen fluoride in a manner similar to that described in Example I. The following reactants were charged to a 1.1 liter turbomixer autoclave: 50 grams of 1-sorbose, 172 grams of toluene, 243 grams of hydrogen fluoride. The mixture was contacted for 45 hours at 0° C. and at atmospheric pressure. At the end of this 45 hours, most of the hydrogen fluoride was flushed from the system by passing a stream of nitrogen through the autoclave. The reaction product, when practically free of hydrogen fluoride weighed 126 grams. From this 126 grams was obtained 82.5 grams of a toluene-free, hydrogen fluoride-free product. This product was separated into 7 grams of a pentane-soluble material, 14 grams of a water-soluble material, and 61.5 grams of a water-insoluble product.

From this latter water-insoluble product 18.5 grams of a pure material melting at 215° C. was obtained. Chromic acid oxidation of a portion of this pure material yielded 4,4'-dicarboxybenzophenone, identified by its dimethyl ester melting at 222-224° C. Equal parts of the sorbose product melting at 215° C., and the fructose product melting at 209-210° C. (Example I) give a mixed melting point of 204-206° C. and therefore the compounds are assumed not to be identical. They are, however, stereoisomers and differ only in the configuration of their respective three asymmetric carbon atoms. The ditolyl-sorbose reaction product is thus assigned the structure:

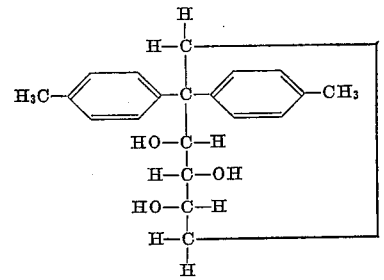

It should again be noted that the di-p-tolyl-desoxy-sorbose condensation product is assumed to contain a cyclohexane ring structure.

Five percent by weight of this di-p-tolyl-desoxy-sorbose was dissolved in warm benzene which on cooling formed a clear, stable, stiff gel.

I claim as my invention:

1. A gelled mixture of a hydrocarbon liquid and from about 0.1 to about 25% by weight of a diaryl-desoxy-ketitol.

2. A gelled mixture of a hydrocarbon liquid and from about 0.1 to about 25% by weight of a di-p-tolyl-desoxy-ketitol.

3. A gelled mixture of a hydrocarbon liquid and from about 0.1 to about 25% by weight of 4,4-bis-(4-methylphenyl)-1,2,3-cyclohexanetriol.

4. A gelled mixture of an aromatic hydrocarbon liquid and from about 0.1 to about 25% by weight of a diaryl-desoxy-ketitol.

5. A gelled mixture of an aromatic hydrocarbon liquid and from about 0.1 to about 25% by weight of a di-p-tolyl-desoxy-ketitol.

6. A gelled mixture of an aromatic hydrocarbon liquid and from about 0.1 to about 25% by weight of 4,4-bis-(4-methylphenyl)-1,2,3-cyclohexanetriol.

7. A gelled mixture of benzene and from about 0.1 to about 25% by weight of a diaryl-desoxy-ketitol.

8. A gelled mixture of benzene and from about 0.1 to about 25% by weight of a di-p-tolyl-desoxy-ketitol.

9. A gelled mixture of benzene and from about 0.1 to about 25% by weight of 4,4-bis-(4-methylphenyl)-1,2,3-cyclohexanetriol.

References Cited in the file of this patent

UNITED STATES PATENTS

| 1,783,133 | Ohle et al. | Nov. 25, 1930 |
| 2,460,803 | Bonner et al. | Feb. 8, 1949 |
| 2,472,276 | Bonner et al. | June 7, 1949 |

OTHER REFERENCES

Ohle et al.: Chemical Abstracts, vol. 26 (1932), p. 1257.

Karrer: Organic Chemistry, Elsevier Pub. Co., Inc., N.Y., 4th ed. (1950), p. 830.

Berger: Chemical Abstracts, vol. 46 (1952), p. 1651.